June 30, 1970  J. A. KONOTCHICK, JR  3,518,555
PULSE TRAIN DETECTORS
Filed Dec. 7, 1967  4 Sheets-Sheet 1
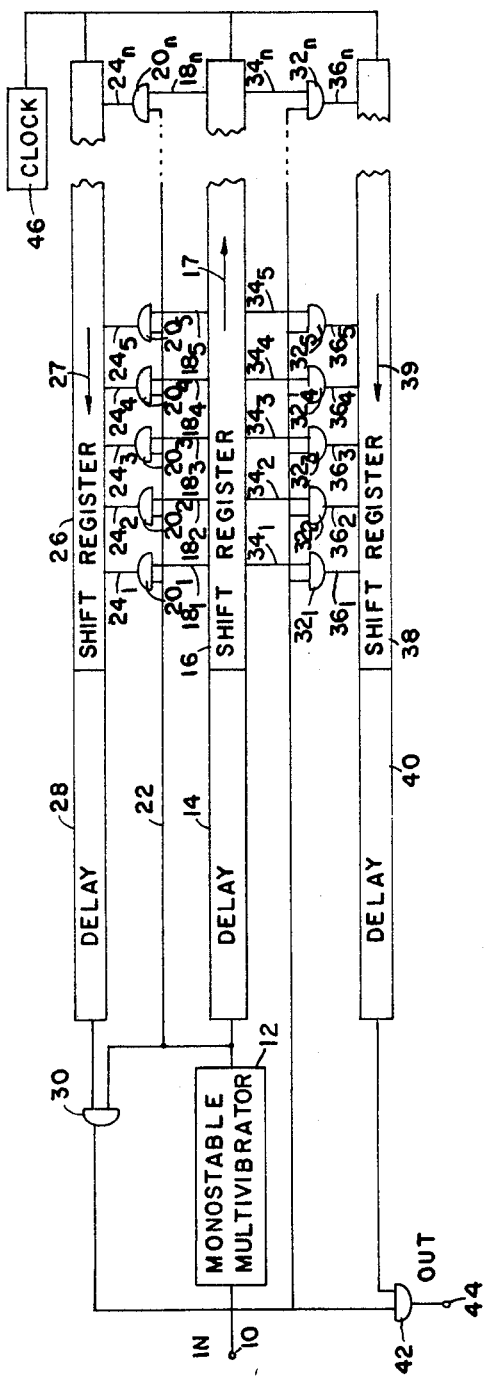
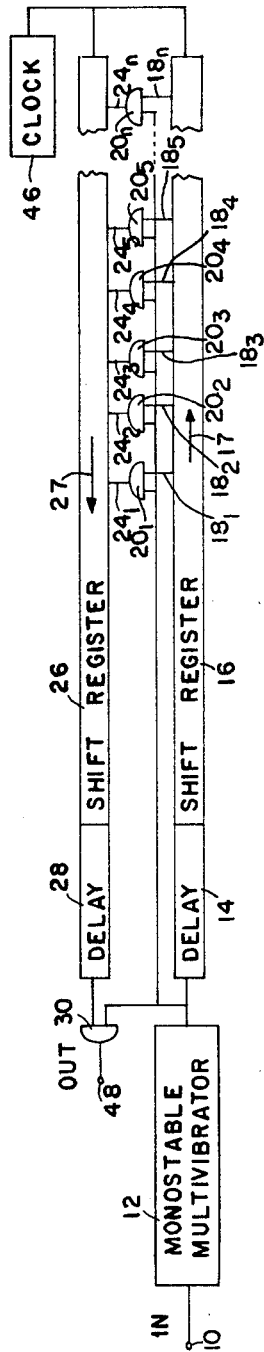
INVENTOR
JOHN A. KONOTCHICK JR.
BY *Richard J. Seligman*
ATTORNEY

INVENTOR
JOHN A. KONOTCHICK JR.

United States Patent Office 3,518,555
Patented June 30, 1970

3,518,555
PULSE TRAIN DETECTORS
John A. Konotchick, Jr., Hudson, N.H., assignor to Sanders Associates, Inc., Nashua, N.H., a corporation of Delaware
Filed Dec. 7, 1967, Ser. No. 688,714
Int. Cl. H03k 5/20
U.S. Cl. 328—110
24 Claims

ABSTRACT OF THE DISCLOSURE

Apparatus is herein disclosed for detecting and sorting pulse trains having predetermined pulse repetition frequencies (PRF's) from a multiple signal environment. The apparatus includes a plurality of shift registers coupled together at predetermined bits thereof by coincidence gates for correlating pulse trains having constant pulse repetition intervals (PRI's) which fall within a predetermined PRF range determined by the number of bits in the shift registers and the number of bits of the shift registers which are not coupled to other ones of the shift registers. The disclosure also illustrates coupling out from the one of the shift registers pulse trains having a specific PRF, that is separating pulse trains according to their PRF.

The invention herein described was made in the course of or under a contract or subcontract thereunder with the Department of the Navy.

BACKGROUND OF THE INVENTION

In many varied applications it is necessary to identify various electromagnetic signals from a multiple signal environment. Some of the applications are radar system, ECM (electronic countermeasures) systems, warning systems and intelligence systems. The most unique single parameter of such signals is their PRF (pulse repetition frequency). Thus, one excellent means for identifying pulse signals is to isolate pulses occurring with a fixed interval between pulses.

In the past, signals with predetermined PRF's were identified by employing pulse counting and linear filters. These arrangements are unreliable in multiple signal environments and lack good noise rejection.

SUMMARY OF THE INVENTION

The present invention comprehends a system for detecting and sorting pulse trains having predetermined pulse repetition frequencies.

In one embodiment a multiple signal environment is received and applied to a combination of shift registers and coincidence gates in order to separate pulse trains having PRF's within a predetermined range.

The incoming signal is applied to a first shift register. The pulses in the first shift register are continually advanced through the stages or bits thereof. Upon reception of a subsequent pulse in the incoming signal which occurs any time after a predetermined delay, pulses in the first shift register will be passed to a second shift register via a plurality of coincidence gates in a non-destructive manner. Upon the further reception of a pulse of the incoming signal which has a time interval between it and the subsequent pulse equal to the time interval between one of the pulses shifted into the second shift register and the subsequent pulse, the pulses in the first register will be shifted into the second shift register and a third shift register. When a fourth pulse arrives with a like time interval between pulses, the pulse in the third shift register will be delivered up as an output from the system. Further pulses in the same PRF train will likewise produce second and subsequent outputs. If other PRF trains of at least four pulse duration are within the PRF acceptance range they too will appear at the output.

The predetermined design PRF range or PRF acceptance range is set by selecting the number of bits of length of the shift register in conjunction with the clocking rate to determine the minimum boundary of the PRF range. The maximum PRF boundary is determined by the amount of delay associated with the shift registers, which in one embodiment is those stages of the shift registers not coupled to the other shift registers via coincidence gates.

A second embodiment of this invention separates signals of different PRF's. This is accomplished by applying the incoming signal to a first shift register which is advancing at a predetermined clock rate. Upon the reception (after a set delay) of a second pulse, the pulses in the first shift register are passed to a second shift register while at the same time being advanced in the first shift register. When a third pulse appears having the same time interval between it and the second pulse as between the second pulse and the first pulse, that pulse in the first register will be gated out as a first pulse of a pulse train of predetermined PRF. Other pulse trains within the predetermined design PRF range will be gated out of different bits of the first register to provide pulse trains of different PRF's within the predetermined design PRF range.

Accordingly, it is an object of this invention to provide an improved pulse train detector.

It is another object of this invention to provide a detector of repetitive pulses employing combinations of shift registers and coincidence gates.

It is a further object of this invention to provide a quadruplet detector.

It is yet another object of this invention to provide apparatus for separating pulse trains having constant predetermined PRF.

It is a still further object of this invention to provide a digital PRF filter.

BRIEF DESCRIPTION OF THE DRAWINGS

The above-mentioned and other features and objects of this invention will become more apparent by reference to the following description taken in conjunction with the accompanying drawings, in which:

FIG. 1 is a block diagram of a quadruplet detector;

FIG. 2 is a block diagram of a triplet detector;

DESCRIPTION OF PREFERRED EMBODIMENTS

Figure 3:
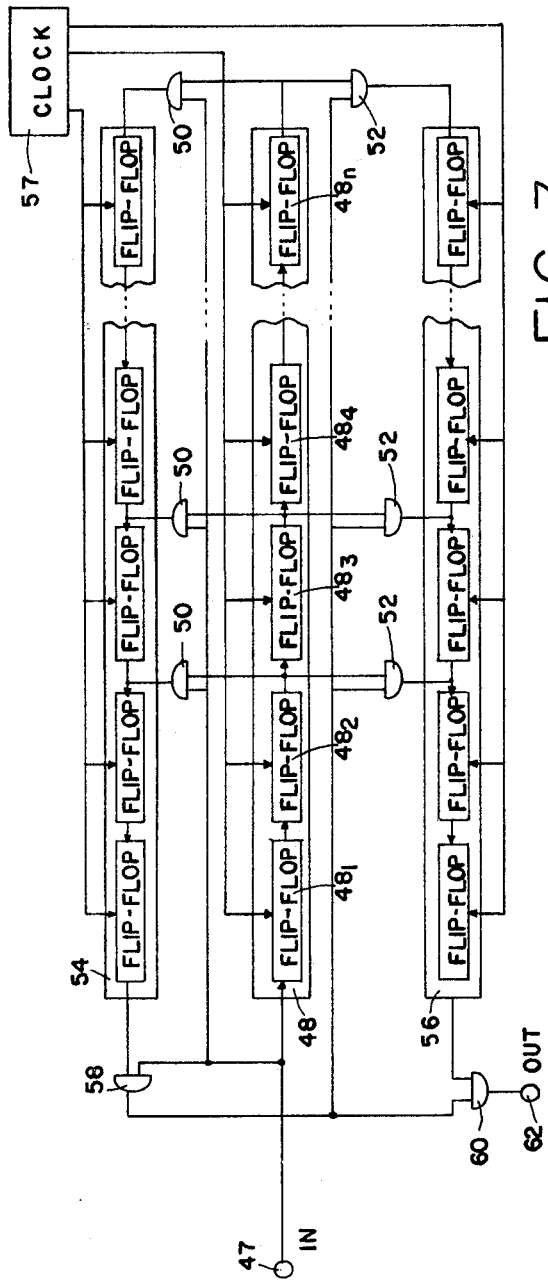
FIG. 3 is a block diagram of a quadruplet detector using bits of shift registers as delays.

Referring now to FIG. 1 there is illustrated thereby a block diagram of a quadruplet detector. The quadruplet detector comprises an input 10 at which signals containing the pulse trains to be recognized or detected are applied. Input 10 is coupled to a monostable multivibrator 12 which is coupled to a delay 14. The output from delay 14 is coupled to a shift register 16 having a plurality of tapped outputs $18_1$–$18_n$, and $34_1$–$34_n$. The output from monostable multivibrator 12 is also coupled via a line 22 to a plurality of coincidence gates $20_1$–$20_n$ having as second inputs thereto shift register tapped outputs $18_1$–$18_n$.

The outputs from coincidence gates $20_1$–$20_n$ are coupled to a series of corresponding taps $24_1$–$24_n$ on a shift register 26. Shift register 26 is coupled to a delay 28 which in turn is coupled to a coincidence gate 30. A second input to coincidence gate 30 is coupled from the output of monostable multivibrator 12.

The output from coincidence gate 30 is coupled to a series of coincidence gates $32_1$–$32_n$ which has as second inputs thereto tapped outputs $34_1$–$34_n$ from shift register 16. The outputs $18_1$–$18_n$ and $34_1$–$34_n$ of shift register 16 are taken at the bits thereof. The outputs from coincidence gates 32 are coupled to a series of taps $36_1$–$36_n$ of a shift register 38. Shift register 38 is coupled to a delay 40 which is coupled to a coincidence gate 42. Coincidence gate 42 has as a second input thereto the output from coincidence gate 30. The pulse trains to be recognized or detected are received at an output 44 of coincidence gate 42. The shift registers 16, 26 and 38 are all simultaneously shifted by an output from a clock 46. Pulses advance through shift registers 16, 26 and 38 in the directions indicated by arrows 17, 27, and 39 respectively.

In this embodiment and those to follow the use of shift registers is preferred. However, the shift registers and clocks could be replaced by tapped delay lines, with the delay lines being coupled by coincidence gates in similar fashion to the coupling of the shift registers.

Operation of the quadruplet detector can be easily traced through FIG. 1, by considering a pulse train at the input terminal 10. As the first pulse enters, it is set to a fixed width by the monostable multivibrator 12. It then starts to travel down delay line 14 and shift register 16. If a second pulse arrives after the first pulse has passed the delay 14 and before it has traveled off the end of shift register 16, then it will be transferred to shift register 26. This occurs because each incoming pulse opens all the coincidence gates 20 between shift register 16 and shift register 26. The first pulse is now shifting toward the left on shift register 26 and to the right on shift register 16 (the information on shift register 16 is not destroyed by the shift). The second pulse now starts to travel through the delay 14 and shift register 16. If a third pulse arrives at the same time that the first pulse is leaving the delay 28 associated with shift register 26 coincidence gate 30 will open activating certain of gates 32 and shift the information which is now on shift register 16 to shift register 38. This third pulse will at the same time shift the information on shift register 16 to shift register 26. In other words, for a pulse to leave gate 30, the interval between the third and the second pulse must be the same interval as between the second and the first pulse. If a fourth pulse arrives and the time interval between the fourth and third pulse is the same as the other intervals, a pulse will exit coincidence gate 42 at output 44. The shift register clock 46 sets the bit size or shifting rate.

Thus, four pulses equally spaced are required for an output at 44. If a fifth pulse arrives with the same interpulse interval as the previous three, it too will cause a pulse to exit at output 44. Therefore, a repetitive pulse train that enters will exit with the same interpulse period (if it is in the desired PRF range). Only the first three pulses will be removed from the pulse train.

In the embodiment illustrated a monostable multivibrator is employed to provide pulses of desired width to be shifted through the registers. It will be apparent to those skilled in the art that monostable multivibrator 12 could be dispensed with, it being used only for optimized operation.

In the quadruplet detector of FIG. 1, four pulses having the same time interval between them must be received before an indication is obtained at output 44. In certain applications the reception of three pulses having constant spacing between the first and second and third would suffice. The embodiment illustrated in FIG. 2 accomplishes this result. This embodiment is similar to the embodiment of FIG. 1 with the deletion of delay 40, shift register 38, coincidence gate 42 and the coincidence gates 32.

As the first pulse enters input 10 of FIG. 2, it is set to a fixed width by monostable multivibrator 12 and applied to shift register 16 via delay 14. When a second pulse is received after the first pulse has passed delay 14 and before it has run the length of shift register 16, it will shift the contents of shift register 16 to shift register 26 (however shift register 16 still retains its contents). When a third pulse is received which has a time interval from the second pulse equivalent to the time interval between pulses one and two, it will again shift pulses from shift register 16 to shift register 26 and furthermore will occasion an output 48 from coincidence gate 30 since the first pulse in shift register 26 arrives at gate 30 simultaneously with the arrival of the pulse at input 10.

The length of the shift registers in FIGS. 1 and 2 is determined by the minimum PRF (pulse repetition frequency) that is acceptable. The number of bits in the shift register is determined by the ratio of the time required for a pulse to travel the total length of the shift register (the maximum PRI (1/PRF) acceptable) and the time-per-bit. That is, the detector of FIGS. 1 and 2 are designed to recognize or detect pulse trains having PRF's within predetermined limits. The time-per-bit, which is adjustable by changing the clock pulse frequency, determines the resolution desired.

The bits could be, for example, 1 microsecond or 20 microseconds wide, depending upon the trade-off between resolution and the number of bits invested. In these two embodiments the delays should be set equal to the minimum PRI (i.e. maximum PRF) that the detector is designed to accept or recognize.

Referring now to FIG. 3, there is illustrated thereby yet another embodiment of a quadruplet detector. This embodiment comprises an input 47 at which signals to be recognized or detected are applied. As in the embodiment of FIG. 1, the input signals could be set to fixed pulse widths by employing a monostable multivibrator. Input signals are applied to a shift register 48 having a plurality of stages $48_1$–$48_n$. In the embodiment illustrated the stages are bistable multivibrators or flip-flops. This is exemplary only. The shift register could be comprised of other sundry binary devices as will be readily apparent to those skilled in the art, for example, memory cores or fluid flip-flops.

The stages of shift register 48, except for the first stage, are coupled via a series of coincidence gates 50 and 52 to a pair of shift registers 54 and 56 respectively. Shift registers 54 and 56 are constructed in similar fashion to shift register 48, with the exception that they shift toward the left. One input to coincidence gates 50 and 52 is derived from shift register 48, while the outputs from coincidence gates 50 and 52 are applied to shift registers 54 and 56 respectively. The shift registers are shifted by an output from clock 57.

Coincidence gates 50 have the input signal at input 47 as second inputs thereto. The output from shift register 54 is applied as one input to a coincidence gate 58, with the input signals incoming at input 47 applied as a second input thereto. The output from coincidence gate 58 is applied to a coincidence gate 60 as one input thereto and is simultaneously applied to coincidence gates 52 as second inputs thereto. The output from shift register 56 is a second input to coincidence gate 60. An output 62 from coincidence gate 60 indicates recognition or detection of a quadruplet having a PRF within a predetermined range.

Operation of this embodiment is very much like the embodiment of FIG. 1 the principal difference being the separate delay are not employed. In the present embodiment the early first stages of shift register 48 and the latter stages of shift registers 54 and 56 act as the delays. Those stages of the shift registers to be used as pure delays are not coupled by coincidence gates. The number of uncoupled stages or bits determine the amount of delay. The number of uncoupled stages illustrated in FIG. 3 (i.e. one) is exemplary only.

As is the case with the previously described embodiments the number of stages or length of the shift registers determines the minimum end of the range of PRF which will be accepted (recognized or detected) by this arrangement and the amount of delay determines the minimum PRF to be accepted.

It should be noted that more than one quadruplet having different PRF can be detected at the same time and pulses of one quadruplet of one PRF can be interlaced with pulses of the other quadruplets. The pulses of accepted pulse trains will appear at output 62 in the same time sequence as they entered input 47 (except that the first three pulses of any train will not appear at the output or will be lost).

Any number of quadruplet detectors can be connected in series for more noise rejection. Other connections could also be made of shift registers and coincidence gates. For example, the output could be taken after coincidence gate 58 (as illustrated by the embodiment of FIG. 2) and these triplet detectors connected in series for an increase in noise rejection. Quadruplet detectors in series would require 4, 7, 10, 13, . . . pulses in sequence for an output; triplet detectors in series would require 3, 5, 7, 9, . . . pulses.

Figure 4:
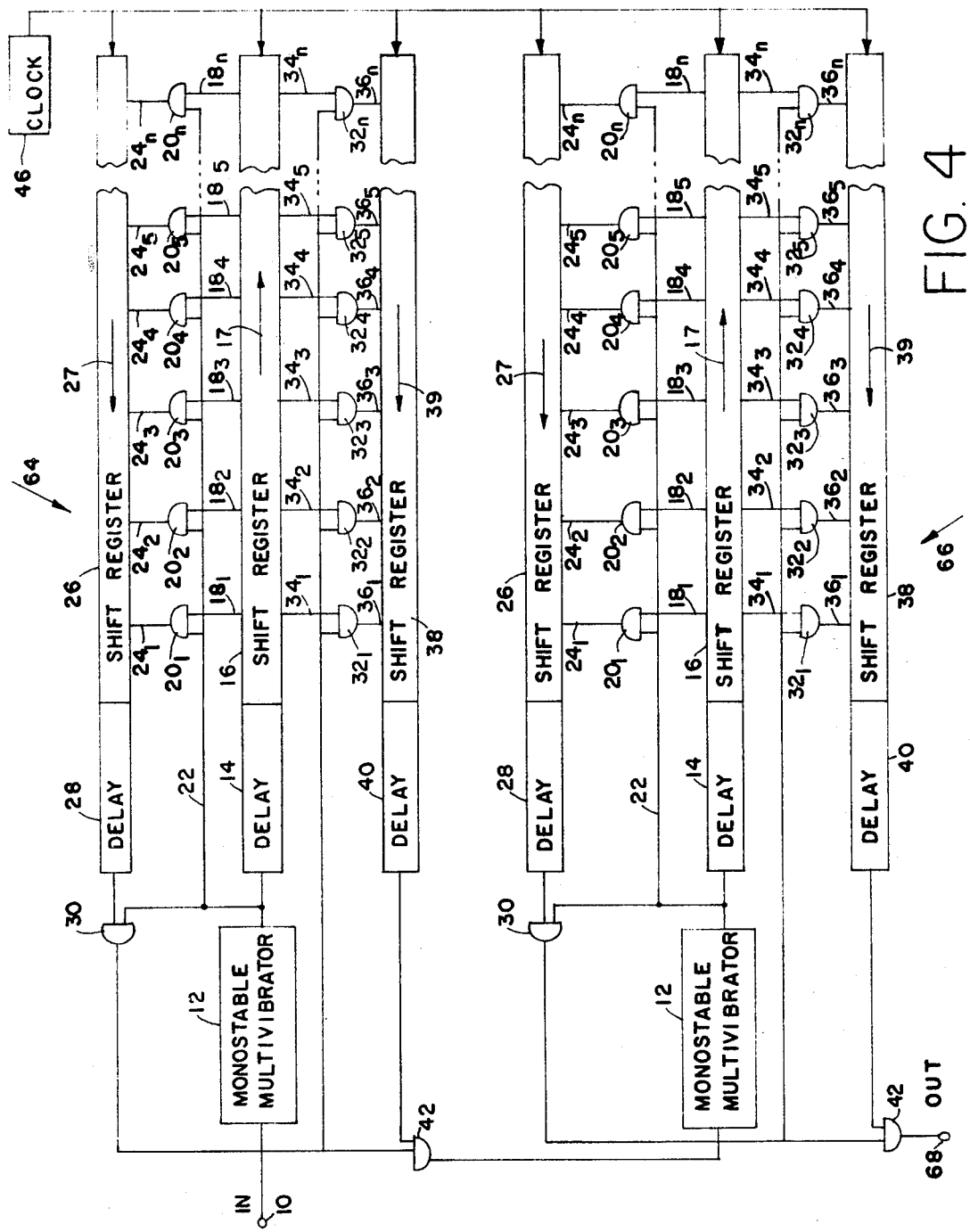
FIG. 4 is a block diagram illustrating two quadruplet detectors of FIG. 1 employed to gain improved noise rejection by increasing correlation time to 7PRI's.

FIG. 4 illustrates the manner in which two quadruplet detectros 64 and 66 (as illustrated in FIG. 1) are combined to provide improved noise rejection.

In this embodiment the output from coincidence gate 42 of quadruplet 64 is applied as the input to quadruplet 66, rather than have a separate input. The output of coincidence gate 42 of quadruplet detector 66 is the output of the detector. An output is obtained at output 68 when 7 pulses of a pulse train having the same time interval between pulses and within the predetermined design PRF range is incident at input 10.

Figure 5:
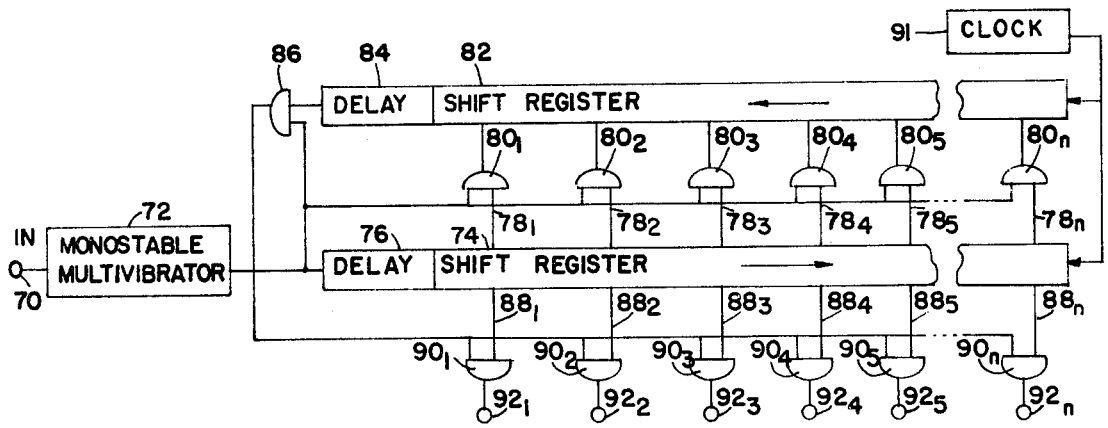
FIG. 5 is a block diagram of a digital PRF filter.

The circuits illustrated above can be slightly modified to sort out pulse trains having specific PRF's from a multiple signal environment. Referring now to FIG. 5 there is illustrated one embodiment of such apparatus.

The signals from which pulse trains having specific PRF's are to be derived are applied at an input 70 to a monostable multivibrator 72. The output from monostable multivibrator 72 is coupled to a shift register 74 via a delay 76. Shift register 74 has a plurality of taps $78_1$–$78_n$ which are coupled to a series of coincidence gates $80_1$–$80_n$ as first inputs thereto. The output from monostable multivibrator 72 is also coupled to the coincidence gates 80 as second inputs thereto. The outputs of coincidence gates 80 are coupled to a plurality of taps on a shift register 82. The last stage of shift register 82 is coupled via a delay 84 to a coincidence gate 86 as an input thereto. The output from monostable multivibrator 72 is a second input to coincidence gate 86. Tapped outputs $88_1$–$88_n$ (which are outputs taken at the same points as $78_1$–$78_n$) from shift register 74) are coupled to a series of coincidence gates $90_1$–$90_n$ as first inputs thereto, second inputs to coincidence gates 90 are obtained at the output of coincidence gate 86. The desired outputs $92_1$–$92_n$ are derived at the outputs of coincidence gates $90_1$–$90_n$ respectively. The shift registers are shifted by a clock 91.

Operation of this apparatus can be traced through the block diagram of FIG. 5.

Consider a pulse train on the input 70 of the device. As the first pulse enters it is set to a fixed width by monostable multivibrator 72. It then starts to travel down delay line 76 and shift register 74. If a second pulse arrives after the first pulse has passed delay 76 and before it has traveled off the end of shift register 74 then the first pulse will be transferred to shift register 82 via one of the coincidence gates 80. This occurs because each incoming pulse activates all the coincidence gates 80 between shift register 74 and shift register 82. The first pulse is now shifting toward the left on shift register 82 and to the right on shift register 74 (the information on shift register 74 is not destroyed by the shift). The second pulse now starts to travel through delay 76 and shift register 74. If a third pulse arrives at the same time that the first pulse is leaving the delay 84 coincidence gate 86 will be open and shift the second pulse out of the device on the bit that corresponds to its PRF. In other words for a pulse to be shifted out the interval between the third and second pulse (PRI) must be the same as the interval between the second and the first pulse.

Thus three pulses equally spaced are required for an output, and the outputs are on a terminal that corresponds to the particular PRF of the pulse train. If a fourth pulse arrives with the same interpulse interval as the previous three it too will cause a pulse to exit at the output. Therefore if a repetitive pulse train enters it will exit unchanged except for the first two pulses being removed from the pulse train. Multiple interlaced pulse trains having PRF's within the predetermined design PRF range will exit at the bit of shift register 76 corresponding to its peculiar PRF.

Figure 6:
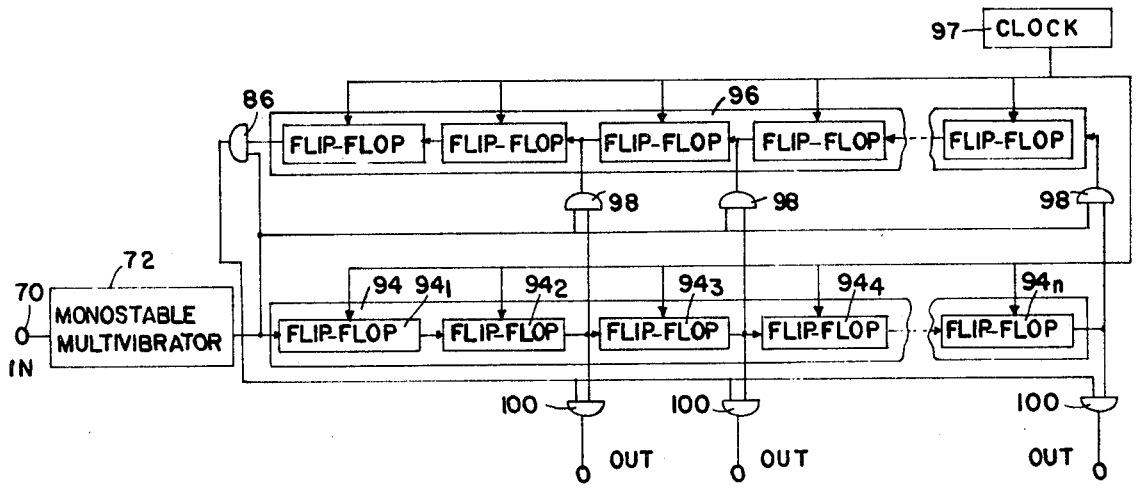
FIG. 6 is a block diagram of a digital PRF filter using bits of shift registers as delays.

FIG. 6 illustrates an alternate embodiment to that of FIG. 5. In this embodiment the output from monostable multivibrator 72 is applied directly to a shift register 94 comprised of a series of flip-flops $94_1$–$94_n$. No external delay is required. The second and succeeding stages $94_2$–$94_n$ of shift register 94 are coupled to a shift register 96 via a series of coincidence gates 98. Second inputs to coincidence gates 98 are applied from monostable multivibrator 72. The last stage of shift register 96 is coupled to coincidence gate 86 as an input thereto. The output from monostable multivibrator 72 is also coupled to coincidence gate 86 as a second input thereto.

The second and succeeding stages of shift register 94 is also coupled to a set of coincidence gates 100 which have as second input thereto the output from coincidence gate 86. The outputs from each of coincidence gates 100 are the respective pulse trains having different PRF's. The shift registers are shifted by a clock 97.

The major difference of this embodiment over that of FIG. 5 is the lack of external delay. One or more of the beginning stages of shift-register 94 and a corresponding number of the latter stages of shift register 96 are not coincidence gate coupled, and act as delays.

The maximum length of the shift register determines the smallest PRF that is to be selected. The number of bits or stages used, along with the clock pulse frequency determines how accurately a given PRF can be selected. The binary bits of the shift register don't have to be flip-flops, but could be any binary bit, e.g., relays, memory cores etc. There is a delay in the left hand side of the shift registers which is determined by the maximum PRF that is to be selected.

If the acceptable PRF region over which the apparatus is to operate is greater than one octave a pulse train at one PRF would cause outputs at ½ this PRF. This necessitates additional circuitry to discriminate between the two. One method of discriminating between the two signals is to "AND" gate both outputs such that an output from the "AND" gate indicates that it is the higher of the two PRF's which have been received. A "NOT AND" output would indicate the lower PRF. Similar circuitry could be used for greater than two octaves as well.

The arrangement of FIGS. 5 and 6 are in effect digital PRF filters.

Figure 7:
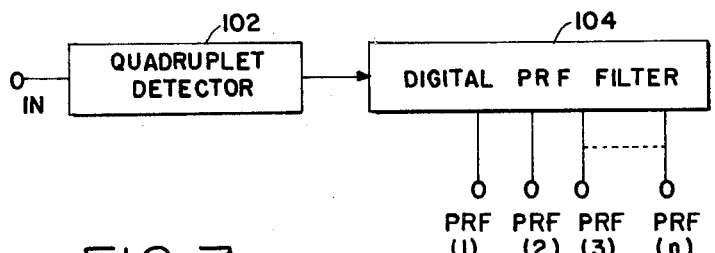
FIG. 7 is a block diagram of a pulse train detector and sorter.

In an environment where many different PRF's are to be detected and where there is also many unwanted signals, a quadruplet detector 102 may be employed to remove unwanted signals prior to using the digital PFR filter 104 to separate signals of different PRF's. This is illustrated in FIG. 7. A triplet detector (as shown in FIG.

2) or a multiple quadruplet detector (as shown in FIG. 4) may be substituted for the quadruplet detector 102.

Thus, it is to be understood that the embodiments shown are illustrative only, and that many variations and modifications may be made without departing from the principles of the invention herein disclosed and defined by the appended claims.

I claim:

1. Apparatus for separating repetitive pulse trains falling within a predetermined pulse repetition frequency range from unwanted pulses, comprising:

input means for receiving said pulse trains and said unwanted signals;

first delay means coupled to said input means, said first delay means having a plurality of predetermined taps;

second delay means having a plurality of predetermined taps; a plurality of logic elements having first and second inputs and an output, said first inputs coupled to said input means, said second inputs coupled to said taps of said first delay means, with said outputs of said logic elements being coupled to said plurality of taps of said second delay means; and an output logic element having first and second inputs and an output, said first input coupled to the end of said second delay means, and said second input coupled to said input means, whereby a signal at said output of said output logic element signifies reception of pulse trains having pulse repetition frequencies falling with a predetermined range, the output signal comprising the pulses of said pulse trains except for the first two pulses thereof.

2. Apparatus as defined in claim 1 in which said first and second delay means includees first and second shift registers respectively and a clock for shifting said shift registers.

3. Apparatus as defined in claim 2 in which said output logic element is coupled to the last stage of said second shift register.

4. Apparatus as defined in claim 3 in which said plurality of logic elements and said output logic element comprise coincidence gates.

5. Apparatus as defined in claim 4, further including a pulse shaping element coupled between said input means and said first shift register.

6. Apparatus as defined in claim 5 in which said pulse shaping element is a monostable multivibrator.

7. Apparatus as defined in claim 3 in which said first delay means includes a first delay element coupled between said input means and said first shift register, and said second delay means includes a second delay element coupled between said second shift register and said output logic element.

8. Apparatus for separating repetitive pulse trains falling within a predetermined pulse repetition frequency range from unwanted pulses, comprising:

input means for receiving said pulse trains and said unwanted signals;

first delay means coupled to said input means, said first delay means having a plurality of predetermined taps;

second delay means having a plurality of predetermined taps;

a first plurality of logic elements having first and second inputs and an output, said first inputs coupled to said input means, said second inputs coupled to said taps of said first delay means, with said outputs of said first plurality of logic elements being coupled to said plurality of taps of said second delay means;

a logic element having first and second inputs and an output, said first input coupled to the end of said second delay means, and said second input coupled to said input means;

third delay means having a plurality of predetermined taps, a second plurality of logic elements having first and second inputs and an output, said first inputs coupled to the output of said logic element, said second inputs coupled to the taps of said second delay means, with said output of said second plurality of logic elements being coupled to the taps of said third delay means; and an output logic element having first and second inputs and an output, said first input coupled to the end of said third delay means and said second input coupled to the output of said logic element, whereby a signal at said output of said output logic element signifies reception of pulse trains having pulse reception frequencies falling within a predetermined range, the output signal comprising the pulses of said pulse trains except for the first three pulses thereof.

9. Apparatus as defined in claim 8 in which said first second and third delay means includes first, second and third shift registers respectively and a clock for shifting said shift registers.

10. Apparatus as defined in claim 9 in which said logic element is coupled to the last stage of said second shift register and said output logic element is coupled to the last stage of said third shift register.

11. Apparatus as defined in claim 10 in which said first and second plurality of logic elements, said logic element, and said output logic element comprise coincidence gates.

12. Apparatus as defined in claim 11 further including a pulse shaping element coupled between said input means and said first shift register.

13. Apparatus as defined in claim 12 in which said pulse shaping element is a monostable multivibrator.

14. Apparatus as defined in claim 10 in which said first delay means includes a first delay element coupled between said input means and the first stage of said first shift register, said second delay means includes a second delay element coupled between the last stage of said second shift register and said logic element, and said third delay means includes a third delay element coupled between the last stage of said third shift register and said output logic element.

15. Apparatus as defined in claim 9 in which each stage of said first, second and third shift registers includes a bistable multivibrator.

16. Apparatus for sorting out pulse trains having predetermined pulse repetition frequencies from a multiple signal environment, comprising:

input means for receiving said multiple signals;

first delay means coupled to said input means, said first delay means having a plurality of predetermined taps;

second delay means having a plurality of predetermined taps;

a first plurality of logic elements having first and second inputs and an output, said first inputs coupled to said input means, said second inputs coupled to said taps of said first delay means, with said outputs of said first plurality of logic elements being coupled to said plurality of taps of said second delay means;

a logic element having first and second inputs and an output, said first input coupled to the end of said second delay means and said second input coupled to said input means;

a second plurality of logic elements having first and second inputs and an output, said first inputs coupled to the taps of said second delay means, and said second inputs coupled to the output of said logic element, whereby at the output from each of said second plurality of logic elements will be incident pulse trains of a specific pulse repetition frequency contained within said multiple environment signal incoming at said input means.

17. Apparatus as defined in claim 16 in which said first and second delay means includes first and second shift registers and a clock for shifting said shift registers.

18. Apparatus as defined in claim 17 in which said logic element is coupled to the last stage of said second shift register.

19. Apparatus as defined in claim 18 in which said first and second plurality of logic elements and said logic element comprising coincidence gates.

20. Apparatus as defined in claim 19 in which said input means includes a pulse shaping element.

21. Apparatus as defined in claim 20 in which said pulse shaping element is a monostable multivibrator.

22. Apparatus as defined in claim 18 in which said first delay means includes a first delay element coupled between said input means and the first stage of said first shift register and said second delay means includes second delay element coupled between the last stage of said second shift register and said logic element.

23. Apparatus as defined in claim 17 in which the stages of said shift registers comprises bistable multivibrators.

24. Apparatus for sorting out pulse trains having predetermined pulse repetition frequencies from a multiple signal environment, comprising:
input means;
a quadruplet detector coupled to said input means; and
a digital pulse repetition frequency filter coupled to the output of said quadruplet detector, whereby pulse trains having a specific pulse repetition frequency will be derived in the outputs of said digital pulse repetition frequency filter.

References Cited
UNITED STATES PATENTS 3,072,855  1/1963  Chandler _____ 328—110 X DONALD D. FORRER, Primary Examiner R. C. WOODBRIDGE, Primary Examiner U.S. Cl. X.R.

307—232, 233, 247; 328—109